(12) United States Patent
Sheen et al.

(10) Patent No.: US 7,425,282 B2
(45) Date of Patent: Sep. 16, 2008

(54) POLYMER LIQUID CRYSTAL DEVICE AND FABRICATION METHOD THEREOF

(75) Inventors: Yuung-Ching Sheen, Hsinchu County (TW); Wen-Ping Chuang, Taipei County (TW); Shu-Mei Wei, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 63 days.

(21) Appl. No.: 11/447,991

(22) Filed: Jun. 7, 2006

(65) Prior Publication Data

US 2007/0063171 A1    Mar. 22, 2007

(30) Foreign Application Priority Data

Sep. 22, 2005    (TW)    ............................. 94132871 A

(51) Int. Cl.
*C09K 19/00*    (2006.01)
*C09K 19/52*    (2006.01)

(52) U.S. Cl. ...................... 252/299.01; 430/20; 428/1.1

(58) Field of Classification Search ................... 430/20; 252/299.01; 428/7.1, 1.1
See application file for complete search history.

(56) References Cited

U.S. PATENT DOCUMENTS

| | | | | |
|---|---|---|---|---|
| 5,643,471 | A * | 7/1997 | Onishi et al. | 216/23 |
| 7,227,603 | B1 * | 6/2007 | Konuma et al. | 349/122 |
| 7,227,610 | B2 * | 6/2007 | Chung et al. | 349/189 |

* cited by examiner

*Primary Examiner*—Geraldina Visconti
(74) *Attorney, Agent, or Firm*—Birch, Stewart, Kolasch & Birch, LLP

(57) ABSTRACT

A polymer liquid crystal device. The polymer liquid crystal device is fabricated by the following steps. A first substrate is provided, and a coating of a photosensitive composition is formed on the first substrate. Next, a second substrate is disposed on the first substrate. Finally, the coating is completely cured without a mask, forming a polymer dispersed liquid crystal film between the first and second substrate. Furthermore, the coating can also be cured with mask, forming a phase separation composite film between the first and second substrate.

22 Claims, 12 Drawing Sheets (2 of 12 Drawing Sheet(s) Filed in Color)

POLYMER LIQUID CRYSTAL DEVICE AND FABRICATION METHOD THEREOF

BACKGROUND OF THE INVENTION

1. Field of the Invention

The invention relates to a liquid crystal device, and more particularly to a polymer liquid crystal device.

2. Description of the Related Art

Liquid crystal displays (LCDs) are widely used due to advantages of reduced power consumption and thickness, lighter weight, and lower driving voltage. LCDs utilize charges in an arrangement of liquid crystal molecules to display images. When additional electric power is applied, photoelectric effects are generated.

In the conventional process for fabricating LCDs, a front substrate is mounted on a rear substrate by an thermal sealant after baking to form a cavity. Next, liquid crystal is poured into the cavity via an injection hole, and the injection hole is blocked by UV sealant. The conventional process, however, has a processing time of more than 20 hours. Specifically, the injection of liquid crystal requires 15-20 hours. Further, more than 40% of the liquid crystal is wasted during liquid crystal injection, thereby increasing cost.

A so-called one drop fill (ODF) process has been developed to replace the conventional liquid crystal injection process. The method for fabricating LCDs employing the ODF process, however, still comprises thermal sealant coating, substrate mounting, and UV sealant curing steps, resulting in long processing time.

Thus, development of a novel liquid crystal device and favricating method thereof, with short processing time and low cost is desirable.

BRIEF SUMMARY OF THE INVENTION

Methods for fabricating a polymer liquid crystal device are provided. An exemplary embodiment of a method for manufacturing polymer liquid crystal device comprises the following steps. A first substrate is provided. A photosensitive composition is coated on the first substrate to form a coating. A second substrate is disposed on the coating. The coating is cured completely without a mask, forming a polymer dispersed liquid crystal (PDLC) film between the first and second substrates. The photosensitive composition comprises: a liquid crystal compound in an amount of 10 to 95 parts by weight; a photo-polymerizable compound in an amount of 5 to 90 parts by weight; and an initiator in an amount of 0.1 to 15 parts by weight, based on 100 parts by weight of the photosensitive composition.

In some embodiments of a method for fabricating a polymer liquid crystal device, a first substrate is provided. A photosensitive composition is coated on the first substrate to form a coating. A second substrate is disposed on the coating. The coating is cured partially to undergo a phase separation, forming a phase separation composite film (PSCOF) between the first and second substrates, wherein the phase separation composite film comprise a plurality of spacers and a plurality of liquid crystal cells. The photosensitive composition comprises: a liquid crystal compound in an amount of 10 to 95 parts by weight; a photo-polymerizable compound in an amount of 5 to 90 parts by weight; and an initiator in an amount of 0.1 to 15 parts by weight, based on 100 parts by weight of the photosensitive composition.

A detailed description is given in the following embodiments with reference to the accompanying drawings.

BRIEF DESCRIPTION OF THE DRAWINGS

The patent or application file contains at least one drawing executed in color. Copies of this patent or patent application publication with color drawing(s) will be provided by the office upon request and payment of the necessary fee.

The invention can be more fully understood by reading the subsequent detailed description and examples with references made to the accompanying drawings, wherein.

DETAILED DESCRIPTION OF THE INVENTION

The invention provides a polymer liquid crystal device having the advantage of simplified fabrication process and short processing time, thereby reducing cost and increasing yield.

The following description is of the best-contemplated mode of carrying out the invention. This description is made for the purpose of illustrating the general principles of the invention and should not be taken in a limiting sense. The scope of the invention is best determined by reference to the appended claims.

Fabrication of Liquid Crystal Device with PDLC Film

Figure 1A:
FIGS. 1a~1g show cross sections of a liquid crystal device with PDLC film according to the invention.
Figure 1B:
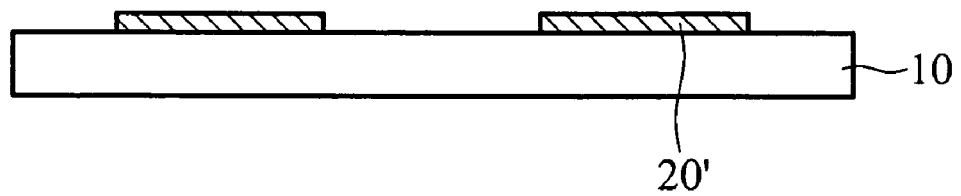

First, referring to FIG. 1a, a first substrate 10 is provided, and a first electrode layer 20 is formed on the first substrate 10. The first substrate 10 can be a glass substrate, plastic substrate, or flexible substrate. According to the invention, the first electrode layer 20 is blanketly formed on the first substrate 10 (as shown in FIG. 1a). In some embodiments of the invention, the first electrode layer 20 can be further patterned to form a first patterned electrode layer 20', as shown in FIG. 1b. Suitable material of the first electrode layer 20 can be a transparent electrode, such as indium tin oxide (ITO), indium zinc oxide (IZO), aluminum zinc oxide (AZO), or zinc oxide (ZnO), and formed by sputtering or plasma enhanced chemical vapor deposition (PECVD).

Figure 1C:
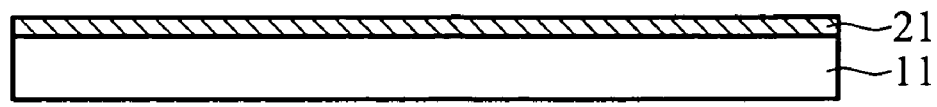
Figure 1D:
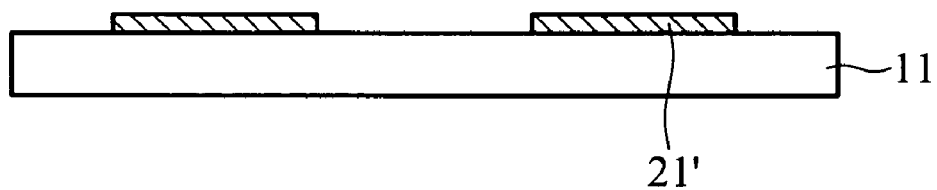

Next, a second substrate 11 is provided, and a second electrode layer 21 is formed on the second substrate 11. The second substrate 20 can be a glass substrate, plastic substrate, or flexible substrate. According to the invention, the second electrode layer 21 is blanketly formed on the second substrate 20 (as shown in FIG. 1c). In some embodiments of the invention, the second electrode layer 21 can be further patterned to form a second patterned electrode layer 21', as shown in FIG. 1d. Suitable material of the second electrode layer 21 can be a transparent electrode, such as indium tin oxide (ITO), indium zinc oxide (IZO), aluminum zinc oxide (AZO), or zinc oxide (ZnO), and formed by sputtering or plasma enhanced chemical vapor deposition (PECVD).

Figure 1E:
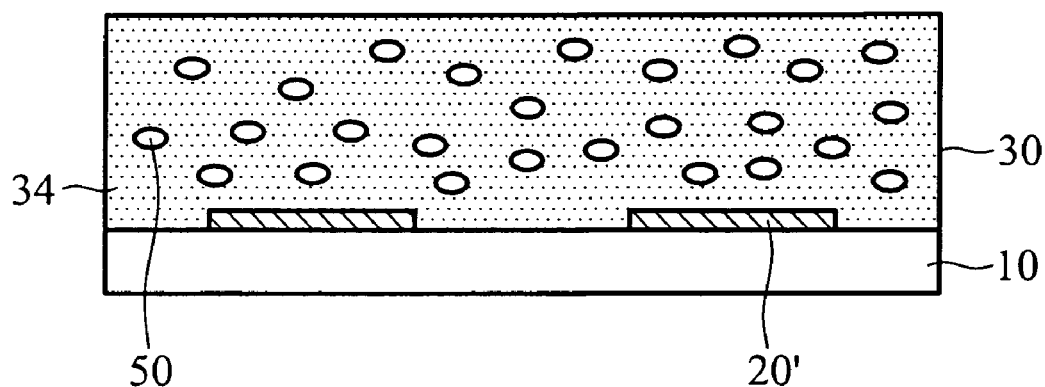

Next referring to FIG. 1e, a photosensitive composition is coated on the first patterned electrode layer 20' to form a coating 30. The photosensitive composition is coated by spin coating, dip coating, roll coating, printing, embossing, stamping, or spray coating. Specifically, the photosensitive composition comprises a liquid crystal compound 50 in an amount of 10 to 95 parts by weight, a photo-polymerizable compound 34 in an amount of 5 to 90 parts by weight, and an initiator in an amount of 0.1 to 15 parts by weight, based on 100 parts by weight of the photosensitive composition.

Specifically, the photo-polymerizable compound can be photo-curable resin, such as double bond containing compound, epoxy group containing compound, acrylic group containing compound, acrylyl group containing compound, isocyanate resin, or combinations thereof. For example, the photo-polymerizable compound comprises acrylic resin, epoxy acrylates, urethane acrylates, polyester acrylates, or combinations thereof. The initiator can be peroxide initiator or azo initiator, such as diethoxy acetophenone, benzophenone, benzyl benzoin isobutyl ether, benzyl dimethyl ketal, 1-hydroxycyclohexyl phenyl ketone, diethyl thioxanthone, 2-ethyl anthraquinone, 2-hydroxy-2-methyl-1-phenylpropane-1-one, 1-(4-isopropylphenyl)-2-hydroxy-2-methylpropane-1-one, 2-methyl-[4-(meyhylthio)phenyl]-2-morpholino-1-propane, aromatic diazonium salts, triallysulfonium salts, diallyiodonium salts, triallylselenium salts of Lewis acid, or combinations thereof.

In the invention, the photosensitive composition further comprising an additive in an amount of 0.5 to 30 parts by weight, based on 100 parts by weight of the photosensitive composition, wherein the additive comprises planarization reagent, leveling agent, tackifier, filler, defoamer, or mixtures thereof. It should be noted that the weight ratio between the liquid crystal compound and the photo-polymerizable compound is 1:9 to 9:1, preferably 1:1 to 4:1.

Figure 1F:
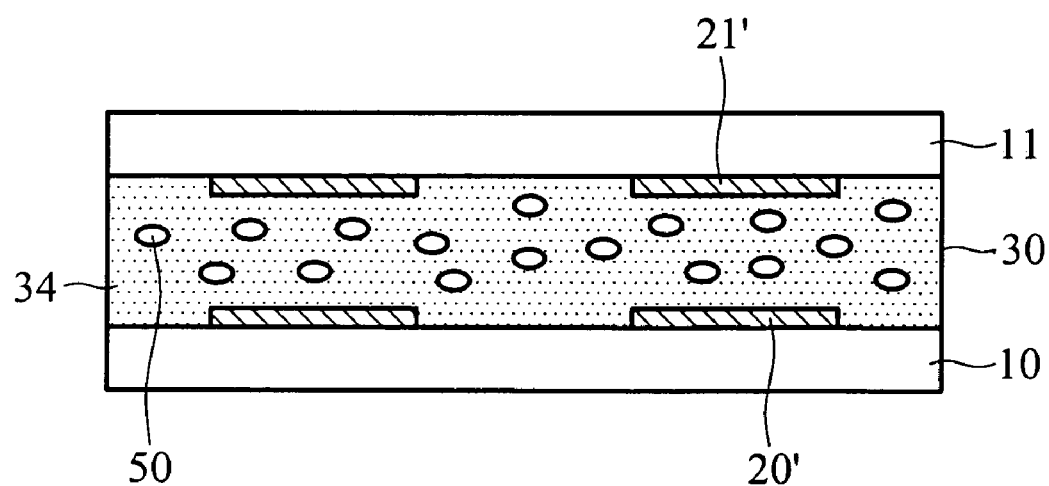
Figure 1G:
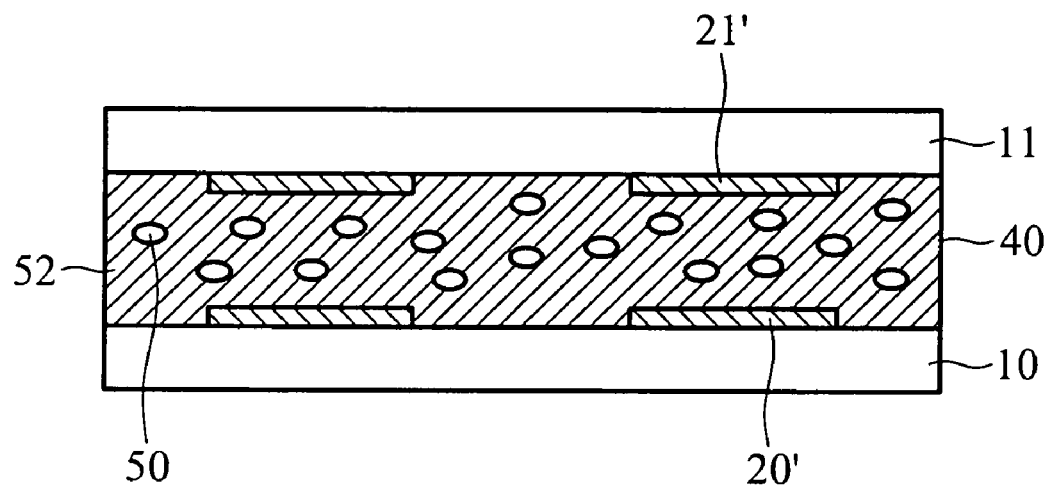

Referring to FIG. 1f, the first substrate 10 and the second substrate 11 are affixed. Next, referring to FIG. 1g, the coating 30 is completely exposed to an actinic ray or radiation to form a polymer dispersed liquid crystal (PDLC) film 40, thus completing the fabrication of polymer liquid crystal device 100. In the polymer dispersed liquid crystal (PDLC) film 40, the liquid crystal compounds 50 are encapsulated by polymer 52 formed by polymerizing the photo-polymerizable compound 34. Noted that, the coating 30 is cured completely without any mask and the first and second electrode layers 20' and 21' are transparent electrodes, thereby forming the blanket polymer dispersed liquid crystal (PDLC) film 40.

Figure 2:
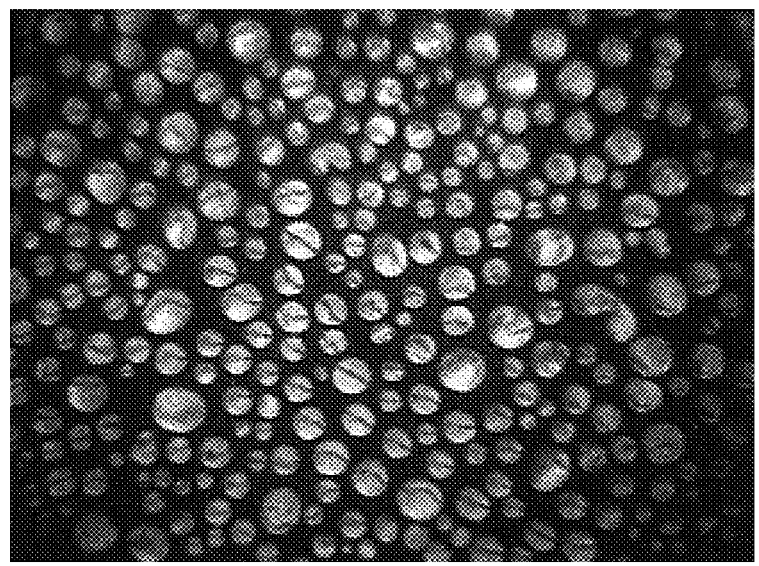
FIG. 2 is a photo of the polymer liquid crystal device employing the PDLC film of the invention.

FIG. 2 shows a photo of the polymer liquid crystal device 100 having PDLC film.

Fabrication of Liquid Crystal Device with PSCOF

Figure 4A:
FIGS. 4a~4g show cross sections of a liquid crystal device with PSCOF according to the invention.
Figure 4B:
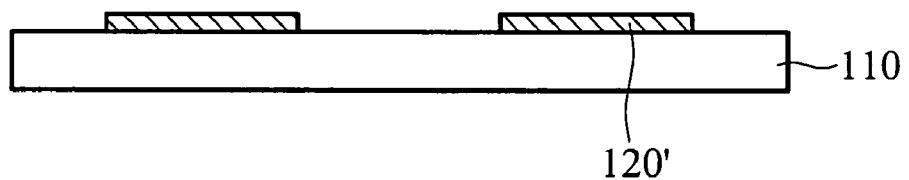

First, referring to FIG. 4a, a first substrate 110 is provided, and a first electrode layer 120 is formed on the first substrate 110. The first substrate 10 can be glass substrate, plastic substrate, or flexible substrate. According to the invention, the first electrode layer 120 is blanketly formed on the first substrate 110 (as shown in FIG. 4a). In some embodiments of the invention, the first electrode layer 120 can be further patterned to form a first patterned electrode layer 120', as shown in FIG. 4b. Suitable material of the first electrode layer 120 can be a transparent electrode, such as indium tin oxide (ITO), indium zinc oxide (IZO), aluminum zinc oxide (AZO), or zinc oxide (ZnO), and formed by sputtering or plasma enhanced chemical vapor deposition (PECVD).

Figure 4C:
Figure 4D:
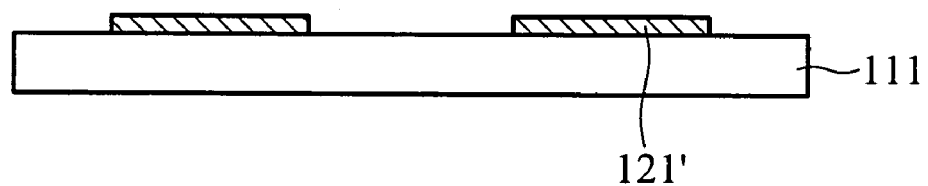

Next, a second substrate 111 is provided, and a second electrode layer 121 is formed on the second substrate 111. The second substrate 120 can be a glass substrate, plastic substrate, or flexible substrate. According to the invention, the second electrode layer 121 is blanketly formed on the second substrate 120 (as shown in FIG. 4c). In some embodiments of the invention, the second electrode layer 121 can be further patterned to form a second patterned electrode layer 121', as shown in FIG. 4d. Suitable material of the second electrode layer 121 can be a transparent electrode, such as indium tin oxide (ITO), indium zinc oxide (IZO), aluminum zinc oxide (AZO), or zinc oxide (ZnO), and formed by sputtering or plasma enhanced chemical vapor deposition (PECVD).

Figure 4E:
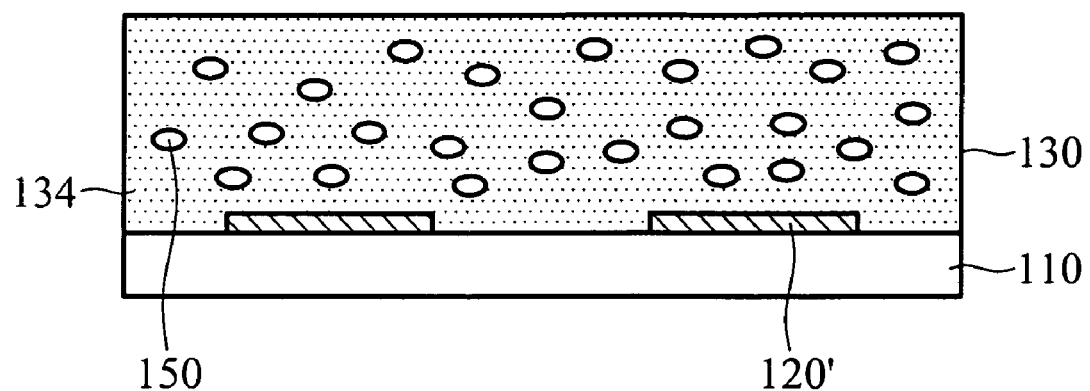

Next referring to FIG. 4e, a photosensitive composition is coated on the first patterned electrode layer 120' to form a coating 130. The photosensitive composition is coated by spin coating, dip coating, roll coating, printing, embossing, stamping, or spray coating. Specifically, the photosensitive composition comprises a liquid crystal compound 150 in an amount of 10 to 95 parts by weight, a photo-polymerizable compound 134 in an amount of 5 to 90 parts by weight, and an initiator in an amount of 0.1 to 15 parts by weight, based on 100 parts by weight of the photosensitive composition.

Specifically, the photo-polymerizable compound can be photo-curable resin, such as double bond containing compound, epoxy group containing compound, acrylic group containing compound, acrylyl group containing compound, isocyanate resin, or combinations thereof. The photo-polymerizable compound, for example, comprises acrylic resin, epoxy acrylates, urethane acrylates, polyester acrylates, or combinations thereof. The initiator can be peroxide initiator or azo initiator, such as diethoxy acetophenone, benzophenone, benzyl benzoin isobutyl ether, benzyl dimethyl ketal, 1-hydroxycyclohexyl phenyl ketone, diethyl thioxanthone, 2-ethyl anthraquinone, 2-hydroxy-2-methyl-1-phenylpropane-1-one, 1-(4-isopropylphenyl)-2-hydroxy-2-methylpropane-1-one, 2-methyl-[4-(meyhylthio)phenyl]-2-morpholino-1-propane, aromatic diazonium salts, triallysulfonium salts, diallyiodonium salts, triallylselenium salts of Lewis acid, or combinations thereof.

In the invention, the photosensitive composition further comprises an additive in an amount of 0.5 to 30 parts by weight, based on 100 parts by weight of the photosensitive composition, wherein the additive comprises planarization reagent, leveling agent, tackifier, filler, defoamer, or mixtures thereof. It should be noted that the weight ratio between the liquid crystal compound and the photo-polymerizable compound is 1:9 to 9:1, preferably 1:1 to 4:1.

Figure 4F:
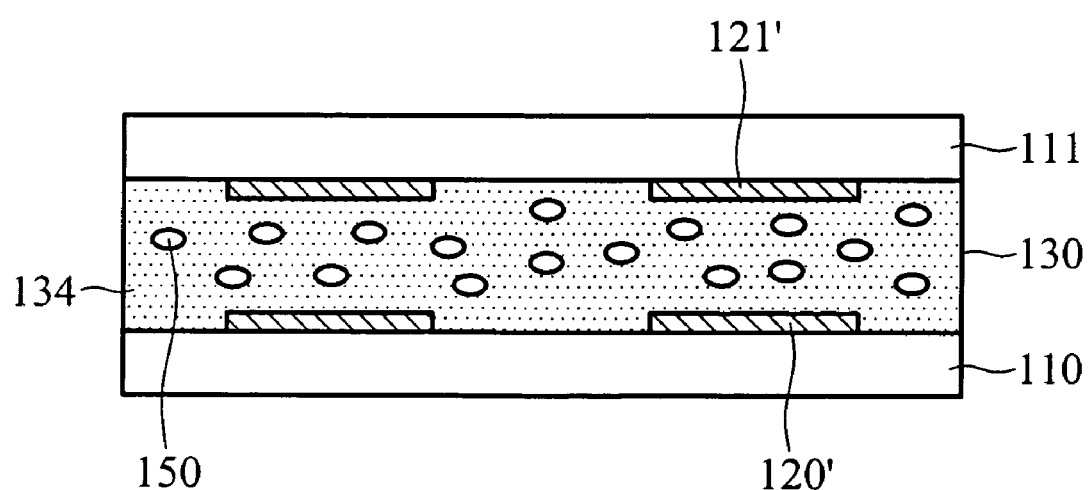
Figure 4G:
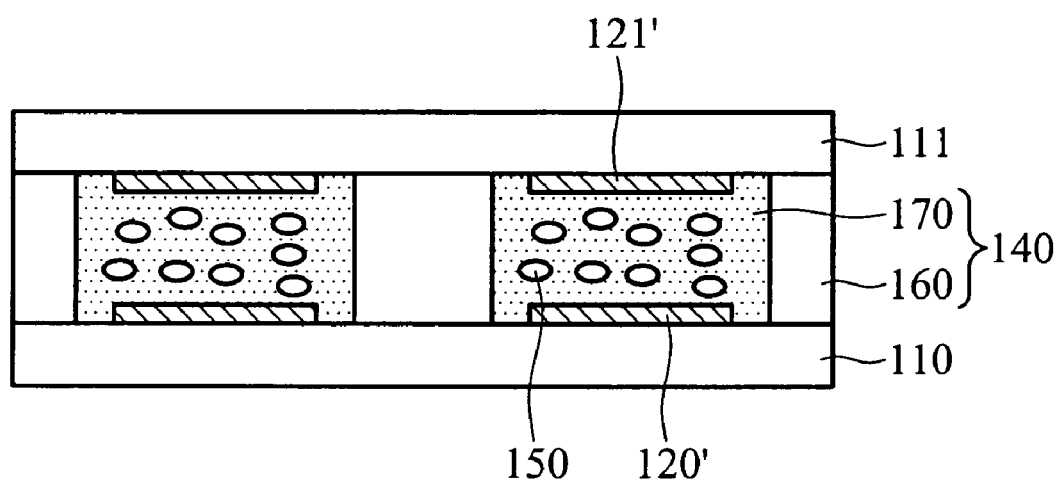

Referring to FIG. 4f, the first substrate 110 and the second substrate 111 are affixed. Next, referring to FIG. 4g, the coating 130 is exposed to an actinic ray or radiation with a mask to form a phase separation composite film (PSCOF) 140, thus completing the fabrication of polymer liquid crystal device 200. Wherein, the phase separation composite film (PSCOF) 140 comprises a plurality of spacers 160 and a plurality of liquid crystal cells 170, and an alignment layer can be formed on the first and second substrate 10 and 111 in advance to be adjacent to the liquid crystal cell 170.

In the phase separation composite film (PSCOF) 140, each two liquid crystal cells 170 are separated by the spacer 160. It should be noted, in the step of exposure, since the coating 130 is cured with a mask, the coating 130 undergoes a phase separation. The photo-polymerizable compound 134 of the exposed coating 130 is polymerized by exposure to form the spacers 160, thereby phase separating the liquid crystal compound 150 to form the liquid crystal cells 170 within the unexposed coating 130.

Figure 5:
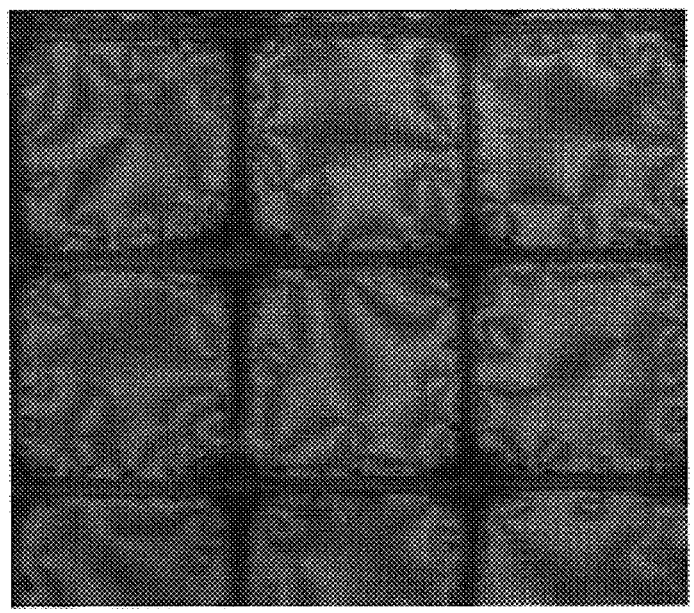
FIG. 5 is a photo of the polymer liquid crystal device employing the PSCOF film of the invention.

FIG. 5 shows a photo of the polymer liquid crystal device 200 having PSCOF.

The following working examples 1 and 2 are intended to demonstrate this invention more fully without limiting its scope, since numerous modifications and variations will be apparent to those skilled in the art.

WORKING EXAMPLE 1

Liquid Crystal Device Having PDLC Film

First, 10 g Norland Optical Adhesive 65 (sold and manufactured under the trade number of NOA-65 by Norland), 3 g hexandiol diacrylate (HDDA), and 0.2 g initiator (sold and manufactured under the trade number of Irgacure184 by Ciba-Geigy) were mixed completely. Next, 0.5 g of the result was mixed with 2 g liquid crystal compound (sold and manufactured under the trade number of E7 by E—Merck, thereby preparing a photosensitive composition A.

Next, the photosensitive composition A was coated on a first glass substrate with blanket ITO electrode layer by a No. 4 Mayer bar (9 μm) to form a photosensitive composition coating covering the ITO electrode layer. Next, the first glass substrate was bonded with a second glass substrate with a blanket ITO electrode layer. Next, the photosensitive composition coating was completely exposed to UV light with a wavelength of 365 nm for 5 sec, forming a polymer dispersed liquid crystal film.

Figure 3:
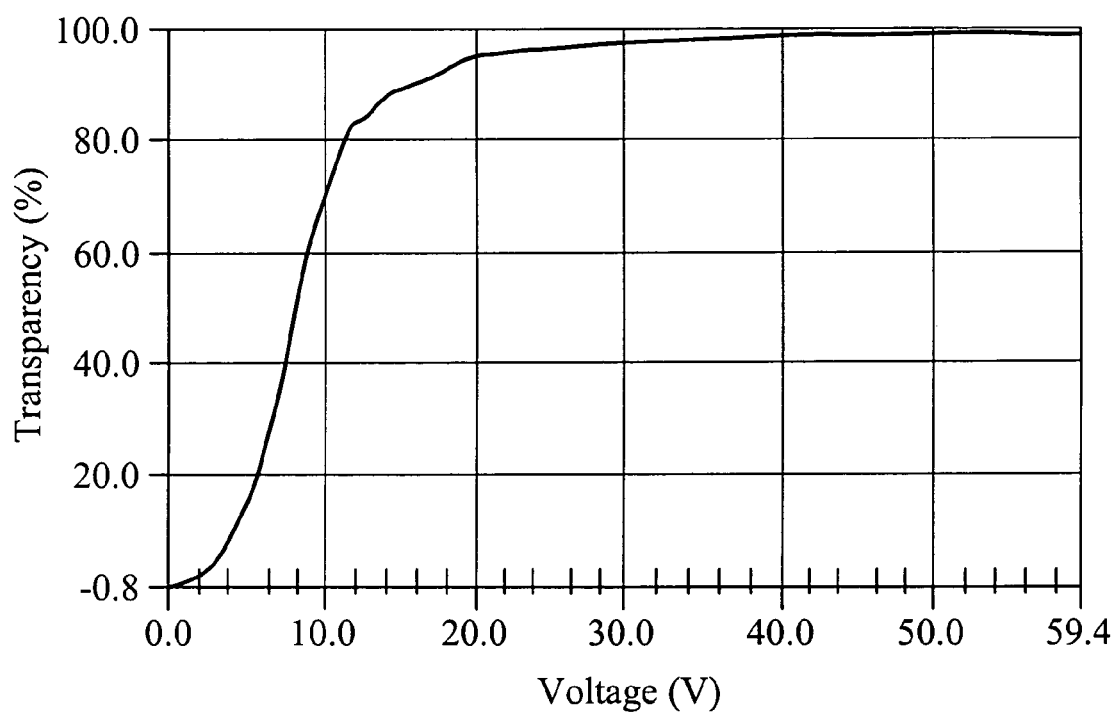
FIG. 3 is graph plotting transparency against operating voltage of the liquid crystal device with PDLC film as disclosed in Working Example 1.

FIG. 3 is graph plotting transparency against operating voltage of the liquid crystal device with PDLC film as disclosed in Working Example 1. Accordingly, since the device has high transparency with increasing operating voltage, the liquid crystal device with PDLC film is suitable for use as an electronic book or smart window.

WORKING EXAMPLE 2

Liquid Crystal Device Having PDLC Film

The photosensitive composition A was coated on a first glass substrate with a blanket ITO electrode layer by a No. 4 Mayer bar (9 μm) to form a photosensitive composition coating covering the ITO electrode layer. Next, the first glass substrate was bonded with a second glass substrate with blanket ITO electrode layer. Next, the photosensitive composition coating was exposed to a UV light (having a wavelength of 365 nm) for 5 sec with a mask. The exposed photosensitive composition coating underwent a phase separation to form a plurality of spacers, resulting in a phase separation composite film with a plurality of liquid crystal cells.

Figure 6:
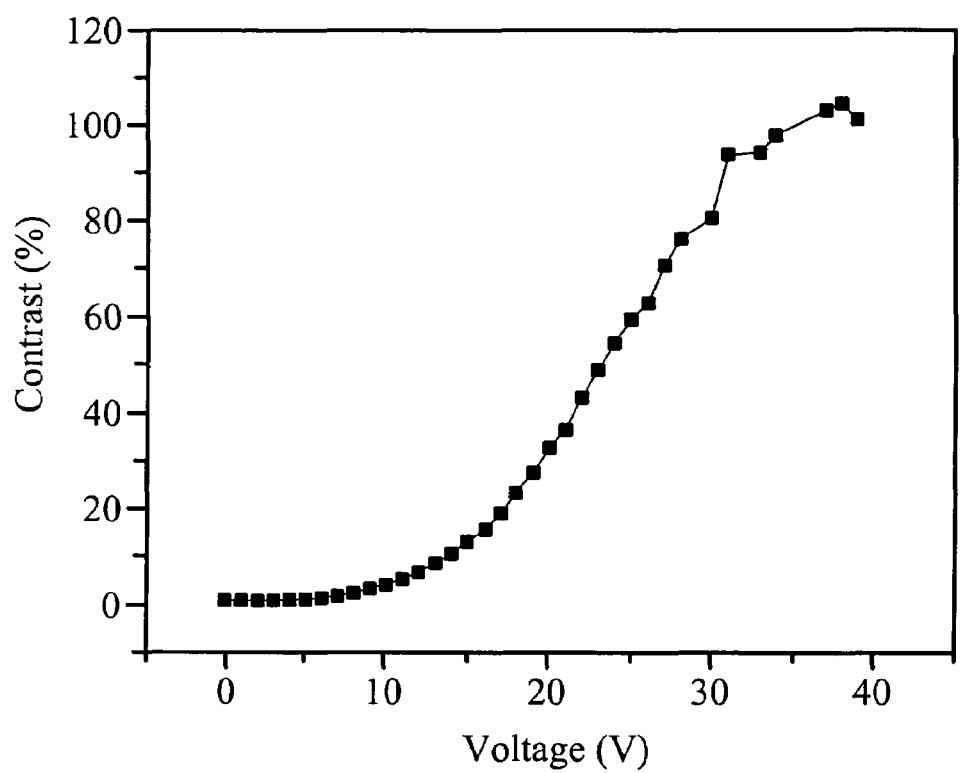
FIG. 6 is graph plotting contrast against operating voltage of the liquid crystal device with PSCOF as disclosed in Working Example 2.

FIG. 6 is graph plotting contrast against operating voltage of the liquid crystal device with PSCOF as disclosed in Working Example 2, wherein the contrast means the transparency ratio of maximum voltage and minimum voltage. Accordingly, since the contrast is raised with increased of operating voltage, the liquid crystal device with PSCOF is suitable for serving as liquid crystal display with high resolution.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for fabricating a polymer liquid crystal device, comprising:

providing a first substrate;

forming a coating of a photosensitive composition on the first substrate, wherein the photosensitive composition comprises:

a liquid crystal compound in an amount of 10 to 95 parts by weight;

a photo-polymerizable compound in an amount of 5 to 90 parts by weight; and an initiator in an amount of 0.1 to 15 parts by weight, based on 100 parts by weight of the photosensitive composition;

deposing a second substrate on the coating; and curing the coating completely without a mask, forming a polymer dispersed liquid crystal film between the first and second substrate.

2. The method as claimed in claim 1, wherein the first and second substrates comprise glass substrate, plastic substrate, or flexible substrate.

3. The method as claimed in claim 1, wherein the photo-polymerizable compound comprises photo-curable resin.

4. The method as claimed in claim 3, wherein the photo-curable resin comprises a double bond containing compound, epoxy group containing compound, or combinations thereof.

5. The method as claimed in claim 3, wherein the photo-curable resin comprises acrylic resin, epoxy acrylates, urethane acrylates, polyester acrylates, or combinations thereof.

6. The method as claimed in claim 1, wherein the initiator comprises peroxide initiator or azo initiator.

7. The method as claimed in claim 1, wherein the initiator comprises diethoxy acetophenone, benzophenone, benzyl benzoin isobutyl ether, benzyl dimethyl ketal, 1-hydroxycyclohexyl phenyl ketone, diethyl thioxanthone, 2-ethyl anthraquinone, 2-hydroxy-2-methyl-1-phenylpropane-1-one, 1-(4-isopropylphenyl)-2-hydroxy-2-methylpropane-1-one, 2-methyl-[4-(meyhylthio)phenyl]-2-morpholino-1-propane, aromatic diazonium salts, triallysulfonium salts, diallyiodonium salts, triallylselenium salts of Lewis acid, or combinations thereof.

8. The method as claimed in claim 1, wherein the weight ratio between the liquid crystal compound and the photo-polymerizable compound is 1:9 to 9:1.

9. The method as claimed in claim 1, wherein the photosensitive composition further comprises:

an additive in an amount of 0.5 to 30 parts by weight, based on 100 parts by weight of the photosensitive composition, wherein the additive comprises planarization reagent, leveling agent, tackifier, filler, defoamer, or mixtures thereof.

10. The method as claimed in claim 1, wherein the photosensitive compositions coated on the first substrate by spin coating, dip coating, roll coating, printing, embossing, stamping, or spray coating.

11. A method for fabricating a polymer liquid crystal device, comprising:

providing a first substrate;

forming a coating of a photosensitive composition on the first substrate, wherein the photosensitive composition comprises:

a liquid crystal compound in an amount of 10 to 95 parts by weight;

a photo-polymerizable compound in an amount of 5 to 90 parts by weight; and an initiator in an amount of 0.1 to 15 parts by weight, based on 100 parts by weight of the photosensitive composition;

disposing a second substrate on the coating; and partially curing the coating to undergo a phase separation, forming a phase separation composite film between the first and second substrate, wherein the phase separation composite film comprises a plurality of spacers and a plurality of liquid crystal cells.

12. The method as claimed in claim 11, wherein the first and second substrates comprise glass substrate, plastic substrate, or flexible substrate.

13. The method as claimed in claim 11, wherein the photopolymerizable compound comprises photo-curable resin.

14. The method as claimed in claim 13, wherein the photocurable resin comprises double bond containing compound, epoxy group containing compound, or combinations thereof.

15. The method as claimed in claim 13, wherein the photocurable resin comprises acrylic resin, epoxy acrylates, urethane acrylates, polyester acrylates, or combinations thereof.

16. The method as claimed in claim 11, wherein the initiator comprises peroxide initiator or azo initiator.

17. The method as claimed in claim 11, wherein the initiator comprises diethoxy acetophenone, benzophenone, benzyl benzoin isobutyl ether, benzyl dimethyl ketal, 1-hydroxycyclohexyl phenyl ketone, diethyl thioxanthone, 2-ethyl anthraquinone, 2-hydroxy-2-methyl-1-phenylpropane-1-one, 1-(4-isopropylphenyl)-2-hydroxy-2-methylpropane-1-one, 2-methyl-[4-(meyhylthio)phenyl]-2-morpholino-1-propane, aromatic diazonium salts, triallysulfonium salts, diallyiodonium salts, triallylselenium salts of Lewis acid, or combinations thereof.

18. The method as claimed in claim 11, wherein the weight ratio between the liquid crystal compound and the photopolymerizable compound is 1:9 to 9:1.

19. The method as claimed in claim 11, wherein the photosensitive composition further comprising:
    an additive in an amount of 0.5 to 30 parts by weight, based on 100 parts by weight of the photosensitive composition, wherein the additive comprises planarization reagent, leveling agent, tackifier, filler, defoamer, or mixtures thereof.

20. The method as claimed in claim 11, wherein the photosensitive compositions coated on the first substrate by spin coating, dip coating, roll coating, printing, embossing, stamping, or spray coating.

21. A polymer liquid crystal device produced by the method of claim 1.

22. A polymer liquid crystal device produced by the method of claim 11.

* * * * *